Figure 1:
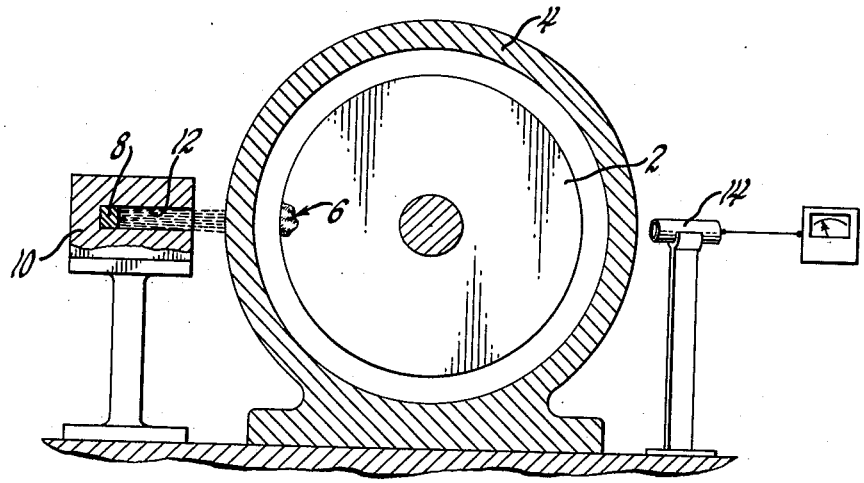

Oct. 8, 1963 W. D. CHEEK ETAL 3,106,641
METHOD OF A VARIABLE CONDITION BY USE OF SHORT
HALF-LIFE RADIOACTIVE SOURCE MATERIAL
Filed Nov. 5, 1958

INVENTORS
Willard D. Cheek, &
BY Henry N. Willcox, Jr.

Paul J. Reising
ATTORNEY

3,106,641
METHOD OF MEASURING A VARIABLE CONDITION BY USE OF SHORT HALF-LIFE RADIOACTIVE SOURCE MATERIAL
Willard D. Cheek, Warren, and Henry K. Willcox, Jr., Grosse Pointe Park, Mich., assignors to General Motors Corporation, Detroit, Mich., a corporation of Delaware
Filed Nov. 5, 1958, Ser. No. 772,029
3 Claims. (Cl. 250—83.3)

This invention relates to an improved method and apparatus for measuring by means of radioactive isotopes.

The utility of radioisotopes for making various types of physical measurements and for the control of manufacturing machinery is well known. In such methods, a radioisotope is positioned, with respect to the article on which the measurement is to be taken, so that a measurement of radiation from the radioisotope is proportionate to the actual physical measurement desired. For example, it is known that the rate of rotation of inaccessible wheels, gears or other rotating members in an engine or other machinery can be measured by positioning a mass of radioactive material on the rotating member and suitably locating a radiation detector to measure the rate at which the radioactive material rotates past the detector and thus the rate at which the member revolves. Another example is the use of a radioisotope to measure and also to control the thickness of sheet stock produced by a rolling mill. One of the rolls, for example, can be plated or otherwise coated with a radioisotope and as the sheet material passes over the roll its thickness is indicated by a radiation detector which measures the amount of radiation penetrating the sheet, the amount of penetrating radiation being proportionate to the sheet's thickness. Numerous similar applications for radioisotopes for industrial measuring and machinery control have been suggested. In all such applications, however, it has been desirable, if not essential, to use long half-lived radioisotopes in order to attain accuracy coupled with freedom from continual maintenance. One of the most serious problems associated with the use of long half-lived isotopes is their safe storage and handling. The problem becomes particularly acute when the radioactive material must be incorporated into relatively complex machinery where time-consuming and difficult manual assembly is required. Operation of machinery so loaded with the radioactive material must be very carefully controlled to assure that the radioactive material is not lost due to leakage or abrasion. Also, extreme care is required to assure against any accident which would result in contamination of the work product or of the work area, and expensive monitoring equipment must be utilized to constantly assure detection of any such contamination so that it can be confined and cleaned up. After completion of the tests, the machinery must be disassembled to remove the radioactive material, and then reassembled to its operational state.

Figure 2:
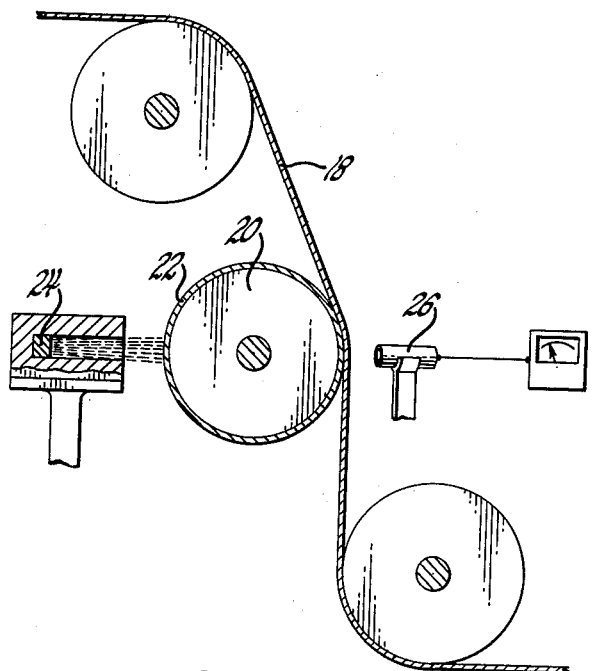

It is an object of the present invention to eliminate the majority of these inconveniences, expenses and hazards. That is, it is an object of this invention to provide a method and means for measuring and testing, with radio-isotopes, which substantially reduces the health hazard, the cost and inconvenience of such operations and without any sacrifice in the accuracy of the results. More specifically, an object of the present invention is the provision of a measuring and testing method and apparatus which obviates the use of long half-lived radio-isotopes in inaccessible locations or in locations where it is subject to wear or in which it presents a contamination hazard. Other objects and advantages of the invention will appear more clearly from the following detailed description of various embodiments thereof and from the accompanying drawings in which FIGURE 1 shows an embodiment of the invention for measuring the rate of rotation of an inaccessible revolving member and FIGURE 2 shows an embodiment of the invention for measuring the thickness of sheet stock.

The method and apparatus of this invention proceeds on the principle of induced radioactivity. That is, in accordance with the invention, an isotope which is normally stable or nonradioactive but which can be transformed by irradiation into a radioisotope of short half life (hereinafter referred to as radioisotope source material) is positioned in the location required to provide the desired measurement and an inducing radiation source consisting of a long-lived radioisotope or other relatively constant radiation source is positioned adjacent the radioisotope source material, preferably in an accessible, guarded location. A suitable radiation detector is located so as to detect the induced radiation emissions from the radioisotope source material. Thus, the primary radiation source constantly induces short half-lived radioactivity in the radioisotope source material, which source material in further combination with the radiation detector functions to perform the desired measurement. Since the induced radioactivity of the radioisotope source material is of short half-life, hazards due to rub-off, leakage or other contamination during or after the operation are minimized, and the primary radiation source being positioned in a protected, easily accessible location, presents the least possible hazard during the operation and can be easily removed for safe storage thereafter.

There are a number of nuclear transformation reactions which can be utilized for the practice of the invention and a number of inducing radiation sources and radioisotope source materials which, in combination, will serve satisfactorily. As the radioisotope source material, there may be used any of the various stable isotopes which emit radiation when bombarded with neutrons, deuterons beta particles, gamma rays, or other radiation. The inducing radiation source can be any relatively long half-lived radioisotope or other radiation source which emits the particular ray or particle required to induce the short half-lived radioactivity in the particular radioisotope source material used. Some of the common nuclear transformation reactions together with examples of isotopes which, in combination, produce them and which may, therefore, be used in the practice of the present invention are as follows:

(1) Thermal neutron induced reactions:

$Ag^{109}(n,\gamma)$ $Ag^{110}$  $T\frac{1}{2}=24$ sec.
$Cu^{65}(n,\gamma)$ $Cu^{66}$  $T\frac{1}{2}=5.1$ min.
$V^{51}(n,\gamma)$ $V^{52}$  $T\frac{1}{2}=3.7$ min.

Inducing sources: Polonium-beryllium with paraffin moderator, radium-beryllium with parafin moderator, Van der Graaff or other accelerator with paraffin moderator.

(2) Fast neutron induced reactions:

$P^{31}(n,\alpha)$ $Al^{28}$  $T\frac{1}{2}=2.3$ min.
$Si^{28}(n,p)$ $Al^{28}$  $T\frac{1}{2}=2.3$ min.

Inducing sources: Any of those listed under (1) above but without moderator.

(3) Photon ($\gamma$ or X-ray) induced reactions:

$Pr^{141}(\gamma,n)$ $Pr^{140}$  $T\frac{1}{2}=3.4$ min.
$P^{31}(\gamma,n)$ $P^{30}$  $T\frac{1}{2}=2.5$ min.

Inducing sources: Cobalt-60, radium, X-ray tube.

(4) Charged particle (beta particle, alpha particle, proton) induced reactions:

| | | |
|---|---|---|
| $Al^{27}(p,\gamma)$ | $Si^{28}$ | $T\frac{1}{2}$ = less than 1 sec. |
| $Li^{7}(p,\gamma)$ | $Be^{8}$ | $T\frac{1}{2}$ = less than 1 sec. |
| $B^{11}(p,\gamma)$ | $C^{12}$ | $T\frac{1}{2}$ = less than 1 sec. |

Inducing sources: Van der Graaff or other particle accelerator.

In addition to the above, there are various well-known proton, alpha and beta reactions and also nuclear resonance reactions which may be utilized to practice the invention.

Referring now to FIGURE 1, there is shown schematically a device in which it is desired to determine the rotational velocity of the wheel 2 which is completely enclosed by casing 4 and therefore relatively inaccessible. In accordance with the invention, there is inserted into the periphery of the wheel a small mass of radioisotope source material 6, for example $Ag^{109}$, and there is positioned external of the casing 4 a source of inducing radiation source 8, for example a polonium-beryllium source with paraffin moderator, having a suitable lead or other shielding 10 with an aperture 12 therein so as to direct the radiation at the material 6 when it is located as shown during each revolution of the wheel. A suitable radiation detector 14 such as an ionization chamber or radiation-sensitive semi-conductor, for example, a cadmium sulfide crystal, is positioned with its associated amplification and other electrical equipment, on the side of the casing oppositely disposed from the inducing radiation source to detect only the induced radiation from the radioisotope source material 6 as it passes in proximity thereto. Hence, as the wheel 2 rotates, material 6 is transformed into the very short half-life radioisotope $Ag^{110}$ as it passes inducing source 8, and the induced radioactivity of the material 6 is detected by the counter 14 each time it rotates. The long-lived inducing radiation source, being external of the housing, can be provided with the optimum shielding and other protection, and is easily accessible so that it can be removed and stored immediately upon completion of the test without any disassembly of the incased device. Since the radioisotope source material 6 has only a very short half-life, it reverts to its non-radioactive, and therefore nonhazardous, state relatively soon after removal of the inducing source 8. In the device as shown, the inducing radiation from source 8 and the induced radiation from source material 6 pass through the casing though, if desired, suitable openings may be provided in the casing at the location of the inducing source 8 and the radiation detector 14.

In FIGURE 2 there is illustrated another embodiment of the invention, the apparatus shown being for the purpose of continuously measuring the thickness or homogeneity of sheet stock. The sheet stock 18 is passed over and in contact with roll 20 which is plated or otherwise suitably coated with radioisotope source material 22. A suitably shielded radiation source 24 is positioned immediately adjacent the roll so that it constantly induces short-lived radioactivity in the material 22. Also, located on the other side of and closely adjacent the sheet stock is a radiation detector 26. The shielding about the source 24 and the mass of the roll 20 prevent any radiation from source 24 from reaching the detector. As the sheet passes over the roll 20, the amount of induced radiation from source 22 which passes through the sheet is monitored by the radiation detector 26 to thereby provide the desired measurement. Any rub-off of the material 22 on the sheet is no serious detriment because of the short half-life. Immediately upon completion of the measurement, the radiation source 24 may be removed for storage.

It will be understood that, if desired, suitable connection means may be provided to control the article being measured, or the manufacture thereof, by way of the measurement taken. For example, means can be incorporated into apparatus such as shown in FIGURE 2 to automatically control the thickness of the sheet stock produced in accordance with the thickness measurements taken.

The advantages of the method and apparatus of this invention are numerous and important. The normally stable radioisotope source material, which serves as the source of the radiation to be measured, can be incorporated permanently and integrally into the device or apparatus from which the measurement is to be taken and since this material is radioactive only in the presence of the inducing source, and is even then only of short half-life, radiation hazards from it are substantially eliminated. The inducing source may be provided with optimum shielding and may be located so that it can be removed whenever it is not needed, thereby further reducing radiation hazards. Further, a single inducing radiation source may be used interchangeably on a number of different machines or devices. For example, a series of production line machines may all be constructed with a radioisotope source material incorporated therein for various particular tests, and a single inducing source may be used first on one machine then on another as required for a complete series of tests. The invention has particular advantage in connection with such embodiment as shown by FIGURE 2. That is, for the measurement of such low mass sheet stock as paper, it is essential for maximum measurement accuracy that a low energy charged particle or photon source be utilized. This requirement makes it essential that the distance between the radiation source and the detector be at a minimum and that the lowest possible mass of material be interposed therebetween. Thus, it is highly advantageous that the radiation source actually contact the paper. Where the low energy radiation source is of long half-life, as in conventional apparatus, such contact is undesirable for the reason that the paper becomes contaminated with long-lived radioactivity. With the present invention, actual contact between the radiation source, i.e., the radioisotope source material, and the paper serves to no detriment since rub-off only results in contamination of the paper with material having such a short half-life as to present no serious radiation hazard.

It will be obvious that numerous other specific embodiments of the invention may be used and that while the invention has been described with particular reference to certain embodiments it is not so limited since various changes and modifications may be made all within the full and intended scope of the claims which follow.

We claim:

1. A method for making a physical measurement on an article comprising positioning on one side of the article a radioisotope source material so that a measurement of radiation from said material which passes through said article is proportionate to the physical measurement desired, said radioisotope source material being normally stable but transformable to a short-lived radioisotope by irradiation, positioning an irradiation source adjacent said radioisotope source material to thereby transform said material to a short-lived radioisotope, and measuring the radiation from said material which passes through said article.

2. A method for measuring the thickness of a sheet comprising positioning on one side of and in contact with said sheet a radioisotope source material so that a measurement of radiation from said material which passes through said sheet is proportionate to the thickness thereof, said radioisotope source material being normally stable but transformable to a short-lived radioisotope by irradiation, positioning an irradiation source adjacent said radioisotope source material to thereby transform said material to a short-lived radioisotope, and measuring the radiation from said material which passes through said sheet.

3. A method for measuring the rate of rotary movement of an article comprising fixedly positioning on the article a small confined body of radioisotope source material so that a measurement of the rate of rotary movement of radiation from said material constitutes a measurement of the rate of rotary movement of the article, said radioisotope source material being normally stable but transformable to a short-lived radioisotope by irradiation, positioning an irradiation source so that it is adjacent said radioisotope source material during at least a portion of its rotary movement to thereby transform said material to a short-lived radioisotope, and measuring the rate of rotary movement of the radiation from said material.

References Cited in the file of this patent

UNITED STATES PATENTS

| | | |
|---|---|---|
| 2,640,936 | Pajes | June 2, 1953 |
| 2,692,951 | Voelker | Oct. 26, 1954 |
| 2,723,351 | Garrison | Nov. 8, 1955 |
| 2,744,199 | Juterbock et al. | May 1, 1956 |
| 2,750,986 | Russell | June 19, 1956 |
| 2,811,650 | Wagner | Oct. 29, 1957 |